March 24, 1959 W. JONES 2,878,919
ARTICLE METERING APPARATUS
Original Filed Feb. 16, 1955 5 Sheets-Sheet 4
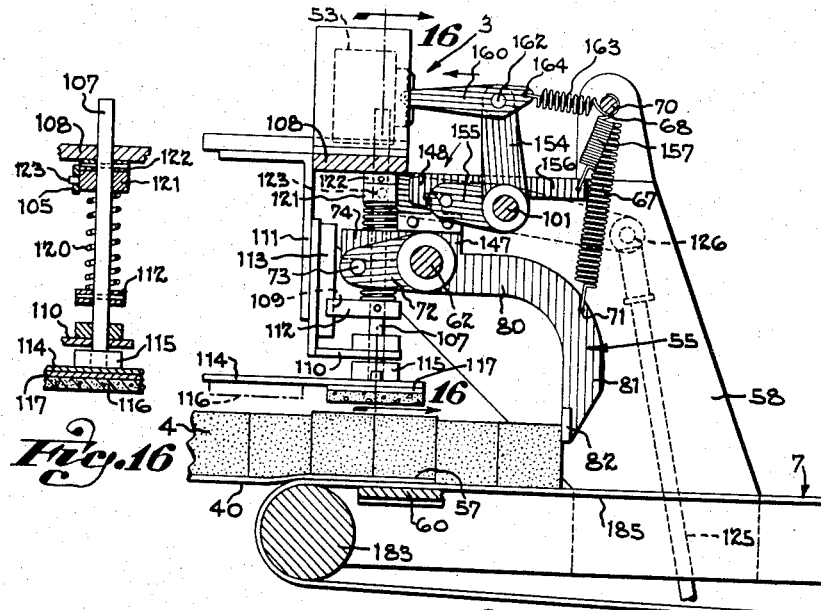
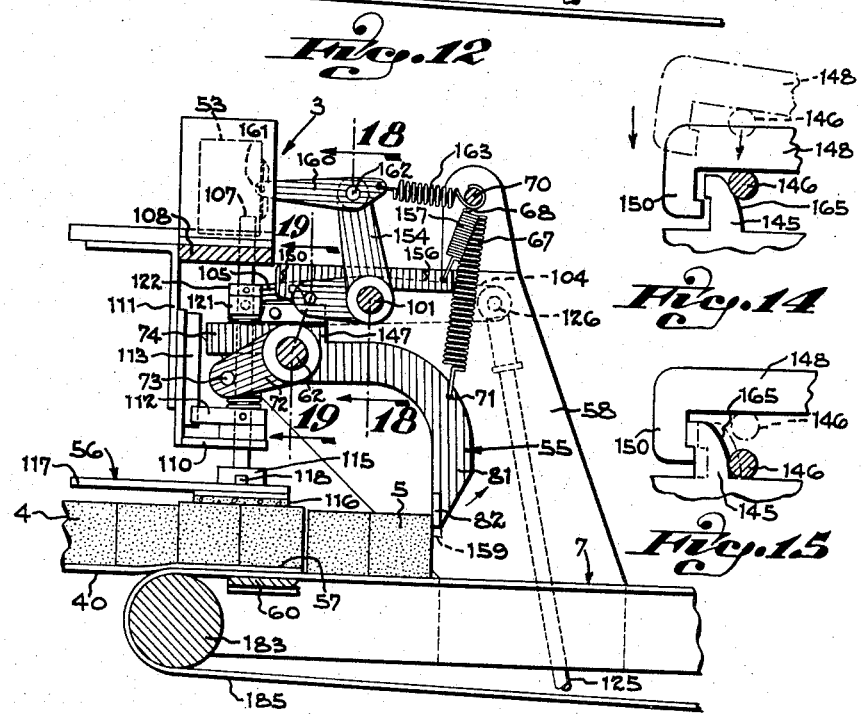
INVENTOR.
Wickliffe Jones.
BY
Wood, Herron & Evans.
ATTORNEYS.

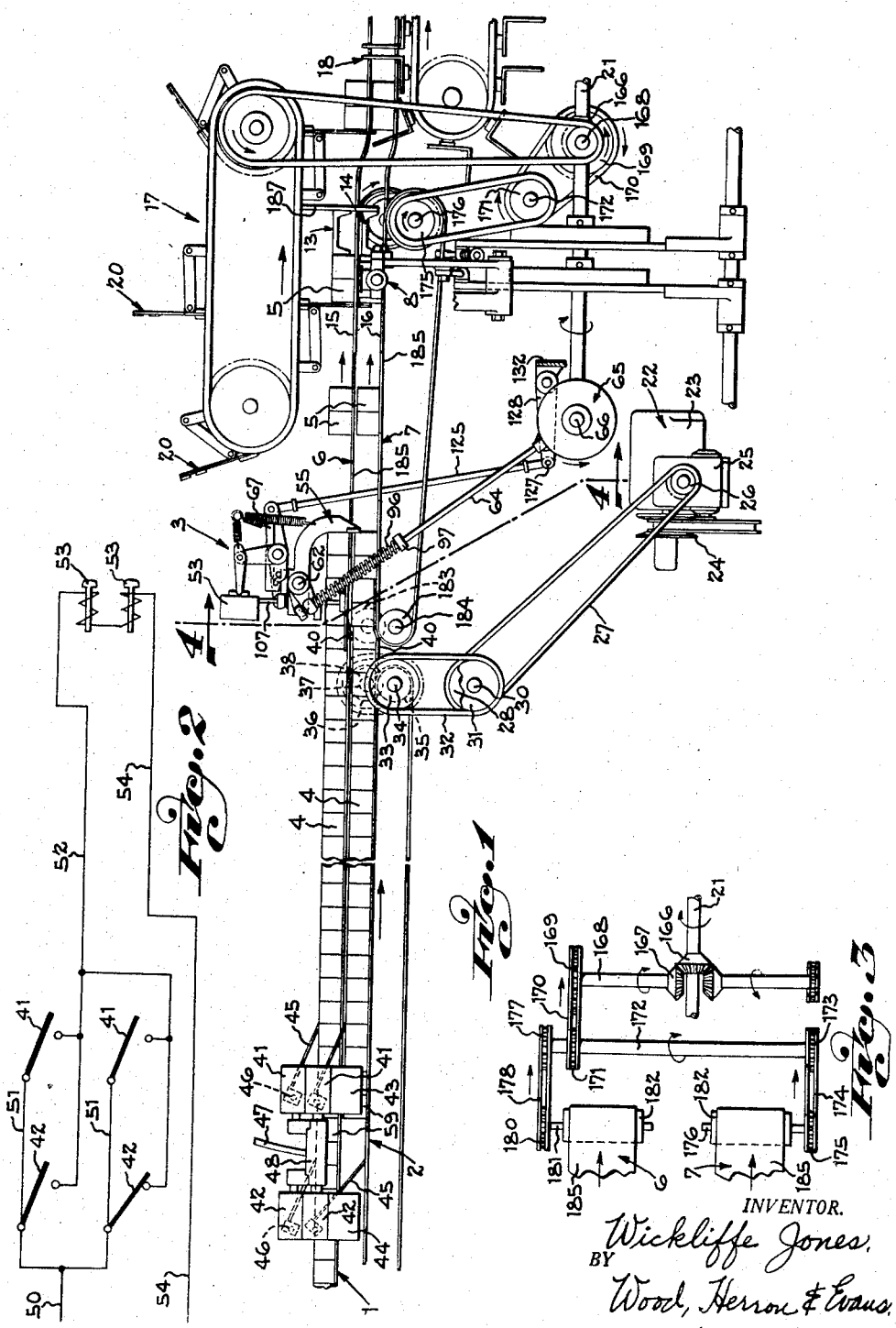

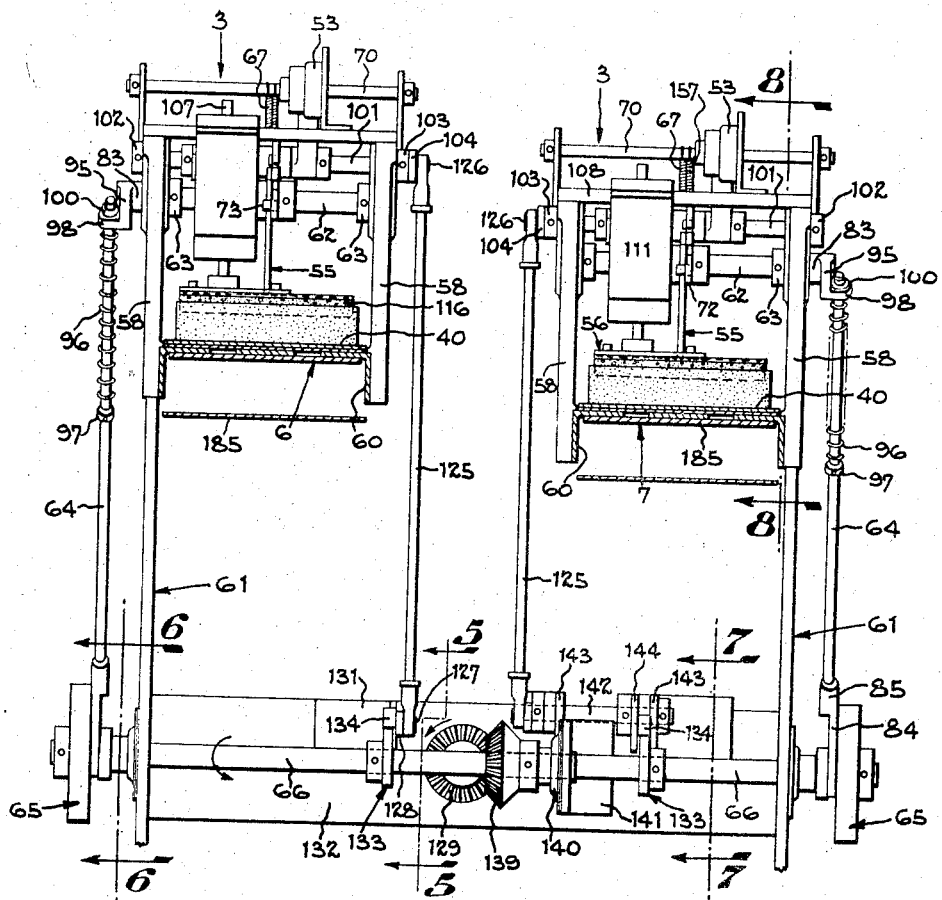
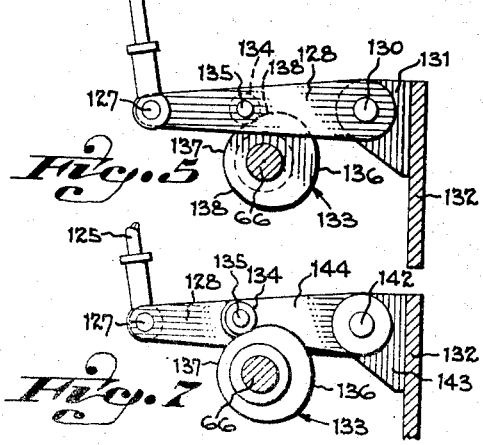
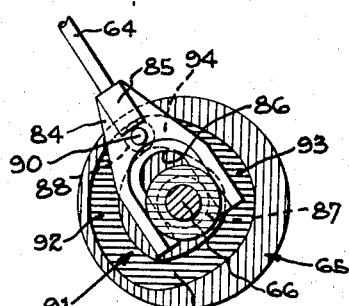

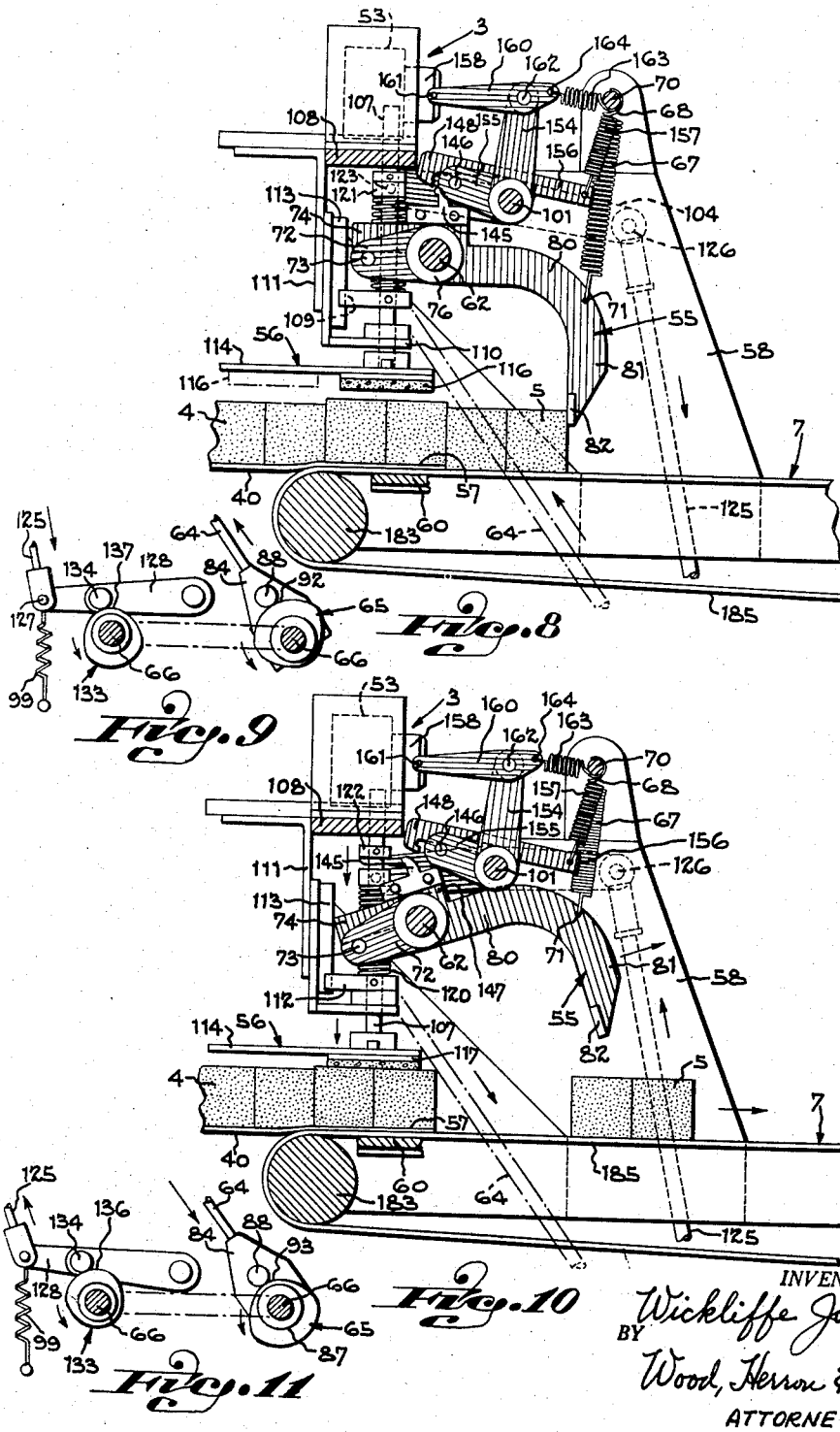

March 24, 1959    W. JONES    2,878,919
ARTICLE METERING APPARATUS
Original Filed Feb. 16, 1955    5 Sheets-Sheet 5

INVENTOR.
Wickliffe Jones,
BY
Wood, Herron & Evans,
ATTORNEYS.

United States Patent Office 2,878,919
Patented Mar. 24, 1959

2,878,919

ARTICLE METERING APPARATUS

Wickliffe Jones, Cincinnati, Ohio, assignor to R. A. Jones and Company, Inc., Covington, Ky., a corporation of Kentucky Original application February 16, 1955, Serial No. 488,659, now Patent No. 2,815,848, dated December 10, 1957. Divided and this application July 24, 1957, Serial No. 673,944

10 Claims.  (Cl. 198—34)

This invention relates to package handling machinery and is directed in particular to a package metering or grouping apparatus for machinery of this character. The present application is divided from the co-pending application of Wickliffe Jones for "Package Metering and Stacking Mechanism," Serial No. 488,659, now Patent No. 2,815,848.

The machine of the co-pending application is intended for article handling in general and is disclosed in its utility of handling individual packages of soda crackers which are fragile and require careful handling to avoid damage to the packages. In the example disclosed, the machine arranges individual packages of soda crackers into groups of four, with one pair of packages stacked upon another for insertion into a standard one-pound carton. The handling machine also may be converted in a simple manner to the grouping of the packages into larger stacks, for example, stacks consisting of eight individual packages with four packages stacked one upon another for insertion in a standard two-pound carton.

One of the primary objectives of the present invention has been to provide a metering mechanism which arrests a flowing stream of individual packages as they advance at random on a conveyor, and which meters the packages into segregated groups which are at timed intervals released and advanced through the machine, subsequently to be reformed into stack formation as outlined above.

Described briefly, the package handling machine of the co-pending application comprises a pair of accumulating conveyors spaced apart laterally from one another and located in two horizontal planes corresponding to the planes which the packages occupy when reformed into stack formation. The individual packages are advanced at random to the accumulating conveyors from a package-wrapping machine or other source. The streams of packages on the two accumulating conveyors are arrested by respective metering mechanisms or stations of the present invention, which reside near the downstream end of the accumulating conveyors. The conveyors advance continuously, such that the respective metering stations accumulate solid rows of prime packages.

The metering stations operate intermittently in time with the other components of the handling machine and release the segregated groups of packages to a pair of metering conveyors which adjoin the ends of the accumulating conveyors. The metering conveyors preferably operate at a higher rate of lineal speed than the accumulating conveyors and advance the segregated groups of packages in their respective planes to a transfer station which shifts two groups endwisely toward one another to stacked formation. From the transfer station, the stacks of packages are advanced by a sweep mechanism into a cartoning machine which inserts the stacked packages into cartons and seals the cartons. The metering stations, transfer mechanism and sweep mechanism all operate in time with the cartoning machine, the several components preferably being driven from a single source of power.

Another objective of the present invention has been to provide, in combination with the metering stations, an electrical control system which decommissions both metering stations in the event that the prime row of packages on either accumulating conveyor becomes depleted, so as to insure the metering and release of the required number of packages upon each metering cycle. The electrical control system includes feeler or sensing arms having switches electrically interconnected with solenoids which are arranged to decommission the metering stations. The feeler rams normally rest upon the solid row of packages on the two accumulating conveyors, and are arranged to drop when the prime row is depleted. When any one of the feeler arms drop, it energizes both solenoids and decommissions both metering stations. When the solid prime rows are restored on the accumulating conveyors, the sensing fingers are elevated, causing the metering stations to be reactivated, as described below.

Described generally, each metering station includes a gate, which in lowered position, engages and arrests the leading end of the solid prime row of packages on the accumulating conveyor, the packages being urged against the gate by frictional engagement with the accumulating conveyor upon which the packages rest. During the metering cycle, a presser foot lightly engages the row from above and arrests the row by frictional engagement, the foot being spaced upstream from the gate a distance which determines the number of packages to be released. While the presser foot is lowered to its package arresting position, the gate ascends and releases the group of packages which reside between the foot and gate, while the foot restrains the solid row extending upstream from the foot. Thereafter, the gate descends to its arresting position and the foot ascends, allowing a solid row again to advance into engagement with the gate. The alternate operation of the foot and gate intermittently meters and releases the groups of packages, which thereupon are carried by the metering conveyors to the other components of the handling machine.

A further objective of the present invention has been to provide a timing apparatus, associated with the electrical control system, noted above, to reactivate the metering stations in time with the operating cycles of the handling machine after the metering stations have been decommissioned temporarily by the control system. For this purpose, each control solenoid actuates a latching mechanism which locks the gate in its lowered or package arresting position when a prime row is depleted. During normal operation, the gate is raised by cam and linkage means in time with the presser foot. When decommissioned, the linkage idles with respect to the gate which is locked in arresting position by its solenoid. When the prime row is restored, the solenoid is deenergized to release the latch; however, the latching mechanism holds the gate in its arresting position until the gate cam and linkage forces the gate to its open position. Accordingly, when the prime row is restored, the opening of the gate is delayed until the proper point in the cycle is reached; thereafter, normal metering operations are resumed in the normal manner.

Although the metering stations are disclosed in duplicate for metering packages which are to be stacked one upon another, it will be understood from the detailed description, that the same structure may be utilized as a single unit to meter single groups of packages where stacking is not required. In this event, a single accumulating conveyor may be utilized to serve the metering station, utilizing the electrical control apparatus and time-regulating latch, as described above, to decommission the metering stations in response to depletion of the prime row on the accumulating conveyor.

Another advantage of the present structure arises from the fact that the metering station may conveniently be converted to the metering of groups consisting of a larger or smaller number of packages, for example, groups of two or four packages as noted above. For this purpose, the presser foot is provided with a demountable pressure pad which may be mounted selectively at two or more different positions relative to the gate. The pad contacts the row of packages and determines the number of packages which are to be released when the gate is elevated, the number being increased when the pad is located upstream from the gate and decreased when it is located downstream toward the gate.

Various other features and advantages of the invention will be more fully apparent to those skilled in the art from the following description taken in conjunction with the drawings.

In the drawings:

Figure 1 is a diagrammatic side elevation of a package handling machine showing generally the location and operation of the metering stations of this invention.

Figure 2 is an electrical diagram showing the circuit of the solenoids which regulate operation of the metering stations in response to the flow of packages on the accumulating or prime conveyors.

Figure 3 is a diagrammatic top plan view taken from Figure 1, showing a portion of the driving system of the metering conveyors and metering stations.

Figure 4 is an enlarged sectional view taken on line 4—4, Figure 1, showing the general arrangement of the metering stations.

Figure 5 is a sectional view taken on line 5—5, Figure 4, illustrating the cam and lever which actuates the presser foot of one of the metering stations.

Figure 6 is a sectional view taken on line 6—6, Figure 4, showing the cam and yoke which actuates the gate of one of the metering stations.

Figure 7 is a sectional view taken on line 7—7, Figure 4, showing the cam and lever which actuates the presser foot of the second metering station.

Figure 8 is an enlarged sectional view taken on line 8—8, Figure 4, detailing one of the metering stations, the parts being shown in package-arresting position.

Figure 9 is a diagrammatic view showing the cams of the metering stations in a position corresponding to that shown in Figure 8.

Figure 10 is a sectional view similar to Figure 8, showing the gate of the metering station in open position to release a pair of packages, the presser foot being lowered to restrain the solid row of accumulated packages on the accumulating conveyor.

Figure 11 is a diagrammatic view showing the cams rotated to shift the parts according to Figure 10.

Figure 12 is a view similar to Figure 8, showing the movement of the parts toward gate latching position when the solenoids are energized to decommission the metering stations.

Figure 13 is a view similar to Figure 12, showing the parts in final latched position.

Figure 14 is an enlarged fragmentary view taken from Figure 12, detailing the motion of the parts toward latching position when the solenoids are energized.

Figure 15 is a view similar to Figure 14, showing in full lines the parts in final latching position, and showing in broken lines the motion of the parts toward gate unlatching position when the solenoids are deenergized.

Figure 16 is a sectional view taken on line 16—16, Figure 12, detailing the presser foot structure.

General arrangement

The metering apparatus of this invention is disclosed in Figure 1 in relation to a packaging machine which assembles elongated, one-quarter packages of crackers into stacks for subsequent insertion into a one-pound carton. As disclosed diagrammatically (Figure 1), the apparatus meters the individual packages in mating pairs disposed in planes one above the other but spaced apart laterally, then shifts the two pairs endwisely toward one another to stack formation, with one pair of packages resting above another. The stack of four packages is then advanced into the bucket conveyor of a cartoning machine for endwise insertion into a carton.

As noted earlier, the metering apparatus may be converted by a simple rearrangement of the mechanism, to group the packages in larger stacks. The apparatus is shown diagrammatically in Figure 20 with the parts arranged to stack the same one quarter pound packages into groups of eight packages for insertion into a two-pound carton. When so converted, the metering apparatus feeds the packages in mating groups of four which are advanced in planes one above the other, the two groups of four packages then being shifted laterally to stack formation one above the other for advancement to the bucket conveyor of the cartoning machine.

Described with reference to Figure 1, the individual packages are wrapped usually in waxed paper or sheet plastic material, the wrapping material being suitably folded at the ends of the package and sealed. The wrapping operation is performed by a wrapping machine (not shown) which forms no part of the present invention. The wrapping machine feeds the packages at random spacing upon a pair of accumulating or prime conveyors, indicated generally at 1 and 2. These conveyors are of the conventional belt type and are located one above the other so as to advance the packages in the two planes which they occupy upon being shifted endwisely into stack formation. The two prime conveyors are spaced apart laterally a substantial distance, as indicated in Figure 3, and the packages rest in crosswise position upon the upper conveyor runs.

The packages on the accumulating conveyors 1 and 2 are advanced until they reach the metering stations, indicated generally at 3 in Figure 1. As shown in Figure 4, each conveyor includes an associated metering station 3, both stations being of duplicate construction. The metering stations are arranged to arrest the packages advancing on the accumulating conveyors 1 and 2 so as to accumulate solid prime rows of packages as indicated at 4—4 (Figure 1) and to release or meter the packages intermittently in segregated groups of two as indicated at 5.

Figure 20:
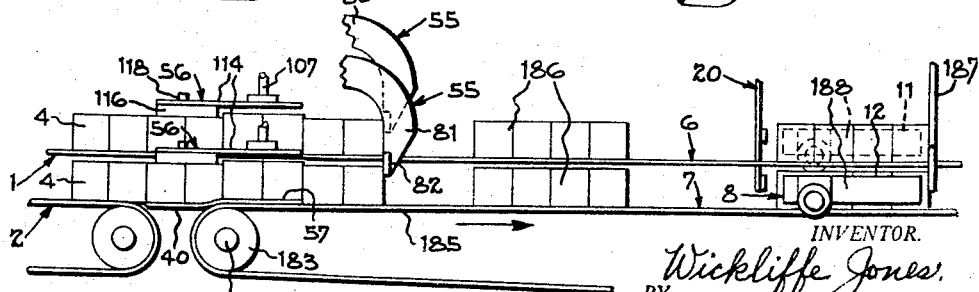
Figure 20 is a diagrammatic view showing certain parts rearranged to convert the apparatus to the metering of packages into groups of four arranged one above the other in stack formation.

The two metering stations 3 are driven in synchronism from a common source of power so that the two pairs of packages are released concurrently upon the upper and lower metering conveyors, indicated at 6 and 7, which advance the two pairs of packages toward the transfer mechanism, indicated generally at 8 (Figure 1). The transfer mechanism is arranged to shift the two groups of packages endwisely into stack formation residing one above the other. As shown in Figure 20, the transfer mechanism 8 is provided with two plungers 11 and 12 operating from opposite sides of the machine, the two plungers residing in planes corresponding to the two planes of the upper and lower metering conveyors to engage the ends of the packages thereon.

Upon release of the pairs of packages by the metering stations 3, the pairs are advanced by the metering conveyors 6 and 7 to respective stops, indicated generally at 13 and 14 (Figure 1) which arrest the pairs of packages 5 and hold them in stationary position in alignment with the opposed plungers 11 and 12 of the transfer mechanism 8 for endwise engagement by the plungers. The timing between the metering stations and transfer plungers is so related to the speed of advancement of the metering conveyors that the pairs of packages dwell temporarily against the stops 13 and 14 before being shifted by the plungers to their superposed position. When the lateral transfer takes place, the pairs of packages are shifted from their metering conveyors 6 and 7 to the related support plates 15 and 16 which occupy the same planes as the metering conveyors. After the packages are shifted laterally to their stack formation by the transfer mechanism 8, they are clear of the stops 13 and 14 and are free to be advanced by the sweep mechanism 17 to the conveyor buckets 18 of a cartoning machine.

The sweep mechanism is provided with a series of pushers, indicated generally at 20, which advance the upper and lower packages in unison along the support plates 15 and 16 to a position for engagement by the buckets 18 of the cartoning machine. After the packages are advanced to the buckets, they are carried into the cartoning machine and are inserted endwisely into the cartons by cartoning mechanism which forms no part of the present invention.

The metering stations 3 and other components of the apparatus, which operate in synchronism with one another, are driven in common from the main drive shaft 21 which also drives the components of the cartoning machine. Therefore, the metering stations feed the grouped packages to the cartoning machine in time with the advancement of the buckets 18 and operations of the cartoning machine. The speed of operation of the package handling apparatus and cartoning machine is related to the rate of operation of the wrapping machine. The prime conveyors 1 and 2 are driven at a rate sufficient to accumulate the solid rows of packages which form a reservoir or prime of packages to be released intermittently in pairs by the metering stations. In order to space the groups of packages as indicated at 5 in Figure 1, the metering conveyors are advanced at a faster rate than the accumulating or prime conveyors. By running the metering conveyors faster, the arresting gates of the metering stations, as explained later, may be closed sooner after releasing metered packages. Moreover, the long rows of packages on the accumulating conveyors have greater time to advance; hence, shock is decreased as the packages are arrested by the metering stations 3.

*Accumulating conveyors*

As indicated in Figure 1, the accumulating conveyors 1 and 2, which advance the packages 4 to the metering stations 3, are driven at the required rate by a variable speed drive unit indicated generally at 22, consisting of a motor 23 connected by the variable speed pulleys 24 to a gear reduction unit 25. The gear reduction unit includes a sprocket 26 connected by a chain 27 to a sprocket 28 mounted on a countershaft 30. A driven sprocket 31 on shaft 30 is connected by a sprocket chain 32 to a sprocket 33 keyed to the shaft 34 of the lower conveyor 2. Conveyor shaft 34 includes a pulley 35, the conveyor belt passing around the pulley in the usual manner.

The upper conveyor 1 includes a similar pulley 36 mounted upon a shaft 37 and driven by a sprocket 38. Sprocket 38 is driven by a sprocket (not shown) similar to sprocket 33 which is also mounted upon shaft 34. The shaft 34 extends completely across the machine to drive both conveyors at uniform speed in the same direction.

In order to simplify the drawings, the frame of the machine and bearings for the several shafts have been omitted from Figure 1. It will also be noted that the support structure for the conveyor belts has been omitted; however, it will be understood that the support structure is similar to that of the metering conveyors and metering stations as shown in Figure 4. It is to be noted that the accumulating or prime conveyors 1 and 2 are in axial alignment with the metering conveyors 6 and 7, such that the packages are transferred in a straight path from the ends of the accumulating conveyors 1 and 2 to the metering conveyors 6 and 7. As indicated in Figures 1 and 8, respective stationary plates 40—40 bridge across the adjacent ends of the conveyors to transfer the packages from the prime to the metering conveyors. It will be understood that the prime conveyors are driven constantly; however, since the metering stations release the grouped packages intermittently, the conveyor belts 1 and 2 necessarily slip with respect to the solid prime rows of packages which are restrained by the metering stations.

In order to provide positive operation of the metering apparatus, the accumulating conveyors are provided with prime control switches which decommission the metering stations when the accumulation or prime of packages becomes depleted beyond a predetermined limit. As explained below, the control switches are interconnected with the metering stations 3 to decommission both stations when the switches of either conveyor are tripped to signal a lack of packages. This prevents the metering stations from feeding until the proper accumulation of packages is restored on the prime conveyors 1 and 2.

As indicated in Figures 1 and 2, the accumulating conveyors are provided with a pair of forward switches indicated at 41—41 and a rearward pair of similar switches indicated at 42—42. The switches are mounted in stationary position upon brackets 43 and 44, which are attached to the frame of the machine (not shown). Each switch includes a feeler arm 45, the arms being mounted upon pivot shafts 46 with the free outer end of each arm resting upon the accumulated row of packages 4 on the upper and lower conveyors 1 and 2. The contacts of the switches are open when their arms are thus elevated. The switches are interconnected by an electrical cable 47 which passes through a junction box 48 to the switch contacts.

The electrical circuit of the switches 41 and 42 is shown diagrammatically in Figure 2. The switches are inserted in the power line 50 in parallel with one another by way of the branch lines 51—51 to the line 52 which leads to both solenoids 53—53. The solenoids 53 form a part of the metering stations 3 and are arranged to decommission the stations upon being energized, as explained in detail later. As shown in the diagram, the solenoids are connected in series with one another and are both energized when one or more of the feeler arms 45 drop downwardly to complete the circuit. The rearward switch 42 for the lower conveyor is shown in this position in Figures 1 and 2. The circuit is thus completed from line 50 through the closed switch 42 to line 52 and through the solenoids in series to the other power line 54, thus decommissioning both metering stations as described in detail later with reference to Figures 12-15.

Switches 41 and 42 are spaced apart four packages or more, consistent with the number of packages to be assembled into a unit charge. The two sets of switches cause the group of reserve packages 59 (Figure 1) to be maintained between the switch arms in addition to the prime row, thus insuring that the prime rows extend back to the switches at all times.

Operating under the conditions shown in Figure 1, the advancement of two additional packages will activate the metering stations and cause the release of two packages from the prime rows during the release cycle, as explained later. As soon as the two packages are released, the arm of switch 42 will again drop to decommission the metering stations until at least two additional packages are advanced to the reserve packages 59 between the switches.

On the other hand, with rearward switches 42 omitted and the prime row depleted, then the solenoid would be deenergized each time and an additional package advances and elevates the switch arm temporarily. Thus, the metering stations would feed two packages upon advancement of a single package, tending to exhaust the prime row. Even if the prime row is never exhausted, the metering stations would be disturbed upon the advancement of each individual package instead of upon the advancement of two packages, thus creating unnecessary starts and stops.

*Metering stations*

As shown in Figure 4, an individual metering station 3 is provided for the upper and lower prime conveyors 1 and 2, both operating in unison by virtue of a common driving system and the prime control switches. As noted earlier, the prime conveyors 1 and 2 are in alignment with the metering conveyors 6 and 7. Since both stations are of identical construction, the following detailed description of the station of the lower metering conveyor 7 applies to both stations.

Described generally with reference to Figures 8 to 10, the metering station includes a gate, indicated generally at 55, and a presser foot indicated generally at 56. It is to be noted that the structure shown in Figures 8 to 10 illustrates the metering station in activated condition, with the solenoid deenergized, as distinguished from Figures 1, 12 and 13, in which the station is shown decommissioned with the solenoid energized. The gate and presser foot are actuated in timed relationship with one another by respective cams and linkage to release the grouped packages in time with the reciprocations of the transfer plungers 8. As shown in Figure 8, the gate is in lowered position arresting the prime row of packages 4 on the accumulating conveyor, while the presser foot is in its elevated position.

In order to release two packages intermittently, the presser foot is first lowered into contact with the prime row of packages to restrain the row (Figure 10), then the gate is elevated to release the two forward packages 5 which reside in advance of the presser foot. It will be noted that the stationary plate 40 has a portion 57 overlying the end of the metering conveyor 7, such that the packages rest upon the stationary plate when engaged by the presser foot. When the gate is elevated (with the foot lowered), the two packages 5, which rest upon the metering conveyor, are advanced by the conveyor 7 as indicated in Figure 10, and after the packages pass beyond the gate, the gate is again lowered to arresting position. Thereafter, the presser foot is elevated back to the position shown in Figure 8. Since the prime row of packages is resting upon the prime conveyor which advances constantly, the row advances against the gate each time the presser foot rises.

As shown in Figure 4, each metering station includes a pair of side plates 58—58 rising upwardly from the angle iron structure 60 which supports the upper runs of the metering conveyors 6 and 7. The angle iron structure in turn is supported by the frame of the machine which is indicated generally at 61. The side plates 58 provide the supports and bearings for the several components of the metering stations.

Figure 17:
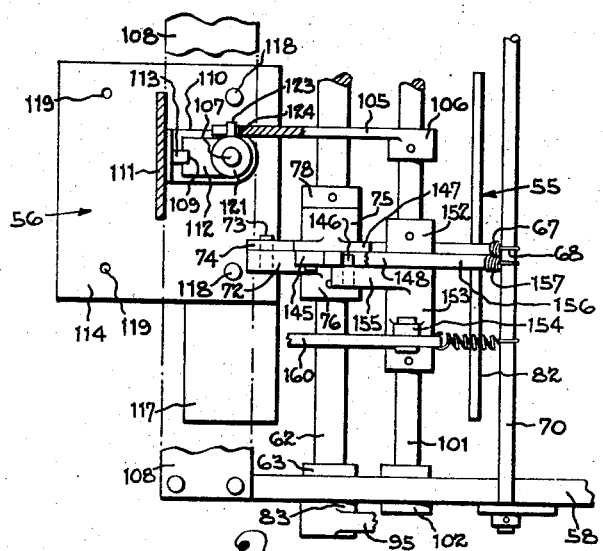
Figure 17 is a fragmentary top plan view of one of the metering stations in latched position corresponding to Figure 13.

Described in detail, with reference to Figures 8 and 17, the gate 55 is pivotally mounted upon a rock shaft 62 having its opposite ends rotatably journalled in the side plates 58. The rock shaft is restrained against axial motion by the collars 63—63 which are secured to the shaft and in bearing engagement against the side plates (Figure 4). The gate is shifted to its open and closed positions by a link 64 having an end connected to the rock shaft 62 as described later. The link in turn is reciprocated by a gate actuating cam, indicated generally at 65 mounted upon a cross shaft 66 journalled in the frame 61 of the machine. The gate is loosely mounted upon its rock shaft 62 and is normally urged to its elevated release position by a tension spring 67 having its upper end anchored as at 68 upon a cross rod 70 extending between the side plates (Figure 8). The lower end of the spring is anchored as at 71 to the gate.

The gate is actuated by a rocker arm 72 pinned to rock shaft 62, the rocker arm having a lateral pin 73 engaging a lever extension 74 which forms a part of the gate 55 (Figure 17). The rocker arm 72 thus holds the gate down against the tension of spring 67 which tends to elevate it. Rotary motion of rock shaft 62 in gate opening direction swings the rocker arm 72 downwardly, allowing spring 67 to pull the gate to its elevated position (Figure 10). When the rocker arm 72 swings upwardly toward gate closing position, as shown in Figure 8, its pin 73 engages the lever extension 74, thus forcing the gate downwardly to its closed position against the resistance of springs 67. By operation of the tension spring, the gate follows the movements of the rocker arm 72 but is free to be latched in its lowered position as explained later.

Figure 19:
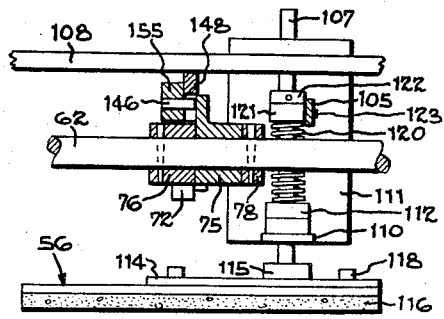
Figure 19 is a fragmentary sectional view taken on line 19—19 of Figure 13, detailing another portion of the gate mechanism.

Described in detail with reference to Figures 17 and 19, the gate includes a hub 75 loosely journalled upon rock shaft 62 while the rocker arm 72 includes a hub 76 which is pinned to the shaft. The rocker arm resides adjacent the lever extension 74 of the gate with its pin 73 projecting laterally beneath the lever extension. The hub 75 of the gate is thus loosely confined between hub 76 and a collar 78 which is pinned to rock shaft 62. When the gate is latched in closed position, the rock shaft 62 and rocker 72 are free to rock with respect to the lever extension 74 of the gate without imparting movement to the gate.

The gate is formed of flat bar stock and comprises a shank 80 extending horizontally from hub 75. The shank curves downwardly and includes a vertical portion 81 which carries upon its lower end a stop bar 82. The stop bar 82 of each metering station extends transversely of the shank and engages the upper edge portion of the first package of the rows advanced by the conveyors 1 and 2, as indicated in Figure 4 when the gates are lowered.

As detailed in Figure 6, each link 64, which actuates the rock shaft 62 of the respective metering stations, includes a yoke 84 attached as at 85 to its lower end. The slotted portion 86 of the yoke slidably embraces the hub 87 of cam 65 to guide the yoke and link during axial reciprocation. Movement is imparted to the yoke and link by a cam roller 88 loosely journalled upon a pin 90 attached to the yoke. The cam roller is confined in the track 91 of the cam which includes portion 92 having a large radius and a portion 93 having a small radius. The two portions of the track are joined by eccentric curves 94—94 which imparts the necessary movements to the link as the cam is rotated.

The upper end of link 64 is connected to the rock shaft 62 by an actuating arm 95 (Figure 4). For this purpose, the rock shaft 62 projects through the side plate 58 and the actuating arm includes a hub 83 pinned to the rock shaft for imparting movement to it. A yieldable connection is established between the link and actuating arm 95 by a compression spring 96 confined loosely upon the link, with its lower end seated against a collar 97 which is pinned to the link. The upper end of the spring is seated against a lug 98 projecting laterally from actuating arm 95. The upper end of the link passes loosely through the lug. A collar 100, which is pinned to the upper end of the link, confines the lug upon the link against the preload thrust of the spring. The thrust of the link is thus transmitted through the compression spring to the actuating arm 95, and under normal operation, the arm is shifted in unison with the link. The compression spring allows the link to overtravel the arm if the gate is obstructed and also when the station is decommissioned, as described in connection with the latching mechanism of the gate.

As best shown in Figures 4 and 17, the presser foot 56 is actuated by a rock shaft 101 having its opposite end portions journalled in the side plates 58. The shaft is locked against axial movement by a collar 102 at one end and by the hub 103 of an actuating arm 104 at its opposite end. The actuating arm 104 is rocked by a cam and link as described in detail later. The presser foot is actuated by a lever 105 having a hub 106 pinned to the shaft 101 (Figure 17).

The presser foot includes a vertical shaft 107 (Figure 16), which is slidably journalled for axial movement in an upper plate 108 and a lower bearing bracket 110. The upper plate extends transversely across the upper edges of the side plates 58—58 and the bearing bracket 110 is supported by a vertical plate 111 projecting downwardly from plate 108 (Figure 12). The shaft 107 is restrained against rotary movement by a finger 112 (Figure 17) pinned to the shaft, the outer end of the finger having a slot 109 slidably traversing a guide bar 113 which projects inwardly from the bearing bracket 110.

Figure 18:
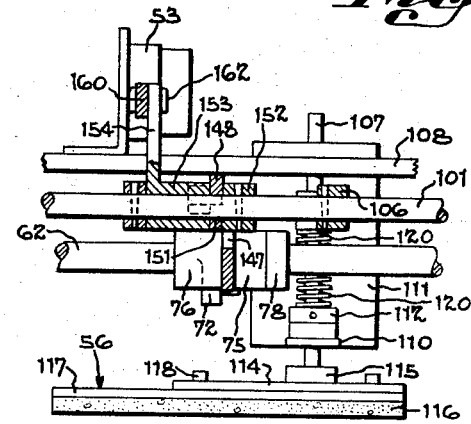
Figure 18 is a fragmentary sectional view taken on line 18—18 of Figure 13, detailing a portion of the gate mechanism.

The presser foot comprises a base plate 114 having a hub 115 attached to the lower end of the vertical shaft 107 (Figures 17 and 18). The presser foot includes a pad 116 formed of foam rubber or the like, attached to a backing plate 117. The pad assembly is attached to the base plate by screws 118. The foam rubber pad provides a soft contact area suitable to restrain the packages without damage. As best shown in Figures 4 and 18, the pad extends transversely for the full length of the package to distribute the pressure across the entire area.

In the event the machine is set up to feed the packages in groups of four instead of two, the pad 116 is shifted to the position shown in broken lines in Figure 12. To provide this adjustment, the rearward portion of the plate 114 is provided with a second set of holes 119 (Figure 17) to receive the screws 118. This modification is described in greater detail with reference to Figure 20.

The lever 105, which actuates the presser foot, yieldably urges the presser foot into engagement with the packages. For this purpose, the vertical shaft 107 includes a compression spring 120 (Figure 16) having its lower end seated upon the guide finger 112 and its upper end seated against a collar 121 slidably fitted upon the shaft. A stop collar 122 is pinned to the vertical shaft above collar 121, the spring being slightly preloaded between stop collar 122 and finger 112. As shown in Figure 17, collar 121 includes a lateral pin 123, which is confined in the slot 124 formed in the swinging end of lever 105. The compression spring 120 provides a slight overtravel of the lever 105 to clamp the packages under light predetermined pressure upon the portion 57 of the stationary plate 40 (Figure 13).

Referring to Figures 4 and 8, each presser foot is actuated by a link 125 having an upper end pivotally connected as at 126 to the actuating arm 104 noted earlier. The lower end of link 125 is pivotally connected as at 127 to the swinging end of a cam lever 128, as shown in Figures 5 and 7. The cam and lever structure shown in Figure 5 actuates the upper metering station and the structure shown in Figure 7 actuates the lower station. Referring to Figure 5, the cam lever 128 is pivotally connected as at 130 to a bracket 131 attached to the cross plate 132 which forms a part of the machine frame. The lever and link are actuated by a presser foot cam 133 which is pinned to the cross shaft 66 for rotation in unison with the gate actuating cam 65. A cam roller 134 is journalled as at 135 upon the cam lever 128, the roller tracking upon the periphery of the cam. To provide the proper movement, the cam includes a portion 136 having a large radius and a portion 137 having a small radius, the two portions joined by the eccentric curves 138—138.

Referring to Figure 4, the cross shaft 66, rotatably journalled at opposite ends in the frame 61, is driven in the direction indicated by a bevel gear 139 which meshes with a bevel gear 129 fixed to the main drive shaft 21.

An intermediate bearing 140 is provided adjacent the bevel gear 139, the bearing being mounted upon a bracket 141 which is attached to the cross plate 132.

Because of the location of the bevel gear, the presser foot cam 133 for the lower metering station is offset laterally. For this purpose, the cam lever 128 is pinned to a cross shaft 142 journalled in brackets 143 secured to the cross plate 132 (Figures 4 and 7). A cam lever 144 is pinned to the opposite end of the cross shaft and includes a cam roller 134 tracking against the cam 133. As indicated diagrammatically in Figures 9 and 11, a tension spring 99 has one end anchored to the end of the cam lever 128 to urge the lever in tracking engagement against the cam.

The cross shaft 66 advances both cams in unison to actuate the presser foot and gate in timed relationship, thereby to release the metered packages 5 intermittently. As indicated diagrammatically in Figure 9, when the mechanism is in package arresting position (Figure 8) the small radius 137 of the presser foot cam 133, tracks against the cam roller 134, thus moving the link downwardly and maintaining it in this position for a short interval, as indicated by the arrow. This holds the presser foot in elevated position for a sufficient period to allow the packages to advance against the gate. Due to the overtravel provided by the presser foot spring 120, the foot is elevated only while the small radius 137 traverses the roller.

While the presser foot is elevated, the large radius 92 of the gate cam 65 tracks against its rollers 88 (Figure 9), thus shifting link 64 as indicated and holding the gate in package arresting position as shown in Figure 8. The gate is maintained in lowered arresting position during the major portion of cam rotation. It will be understood that the presser foot dwells in lowered position when the gate is elevated and remains lowered until the gate is again lowered to arresting position. This allows the two packages 5 to be released upon the metering conveyor while the solid row is restrained by the presser foot and allows the gate to return to arresting position before the row is again released by the presser foot.

Referring to Figures 10 and 11, showing the release position of the mechanism, the presser foot is dwelling in its lowered package restraining position as the large radius 136 of the presser foot cam is tracked against the roller 134. At the same time, the small radius 93 of the gate cam 65 is traversing the cam roller 88 to shift link 64 downwardly, causing the gate to be shifted to elevated position to release the packages. The small radius maintains the gate in this position until the packages have been advanced by the metering conveyor to a position clear of the gate, then the gate is lowered.

It will be understood that the gate and presser foot cams of both metering stations rotate in unison to release the packages upon both metering conveyors concurrently. Upon release, both groups of packages advance in unison as indicated at 5 in Figure 1.

Preferably, as shown in the present drawings, packages are aligned laterally before being superposed. In other instances, the packages may be longitudinally offset and are aligned when engaged by the sweep mechanism.

Latching mechanism

As stated earlier, both metering stations are decommissioned simultaneously by the solenoids 53 in the event one of the metering switches 41 or 42 closes to indicate a depletion in the solid rows or prime of packages on the accumulating conveyors. The latching mechanism, which decommissions the gate of the metering station is in duplicate for both metering stations; therefore, the following detailed description of the latching mechanism with reference to the lower station also applies to the upper station.

As shown in Figures 8 to 15, the gate includes a hook 145 which is secured to an extension 147 of the gate above rock shaft 62. During normal operation (Figures 8 and 10) the solenoid 53 remains deenergized, such that the hook is free to reciprocate without interference. When one of the switches 41 or 42 is closed to energize the solenoid, a latching lever 148 is lowered to engage the hook 145 of the gate and to latch the gate in package arresting position as shown in Figures 13 and 15.

For this purpose, the swinging end of the latching lever 148 includes a latching hook 150 which engages the hook 145 as shown (Figures 14 and 15). Thus, although the rock shaft 62 and rocker arm 72 continue to operate as shown in Figure 13, the latching lever 148 holds the gate in its lowered arresting position against the action of spring 67.

Described in detail with reference to Figure 18, the latching lever 148 includes a bore 151 loosely journalled upon the rock shaft 101. The latching lever 148 resides loosely between a collar 152 and the hub 153 of a bell crank lever 154. The bell crank lever is actuated by the solenoid as described later and its lower arm 155 includes a lateral pin 146 which projects beneath the latching lever 148 to lower the lever when the solenoid is energized (Figures 12 to 15).

Referring to Figures 8 and 10, the latching lever 148 includes a tail piece 156 projecting outwardly beyond rock shaft 101. A tension spring 157 has its lower end anchored to the tail piece and has its upper end connected to the cross rod 70. The spring normally urges the hook end of the latching lever downwardly toward latching position. However, so long as the solenoid is deenergized, the pin 146 of bell crank lever 154 holds the latching lever in unlatched position against the tension of spring 157 as shown.

For this purpose, the bell crank lever is connected to the armature 158 of solenoid 53 by a link 160. The link has one end pivotally connected to the solenoid armature as at 161 and its opposite end pivotally connected to the bell crank lever as at 162. A tension spring 163 has one end anchored upon cross bar 70 and has its opposite end connected to the link as at 164, thus urging the bell crank lever constantly in unlatching position as shown in Figure 12. It will be understood that spring 163 provides greater tension than spring 157 so as normally to hold the latching lever 148 in its unlatched position against the force of spring 157.

When the solenoid is energized, as shown in Figure 12, its armature shifts the bell crank lever downwardly counter to spring 163, thus allowing latching lever 148 to be shifted to latching position by operation of spring 157. In the preliminary latching position, shown in Figures 12 and 14, the pin of the solenoid-operated bell crank lever 154 cams against the cam surface 165 of hook 145 and thus limits the movement of the bell crank lever under the influence of the solenoid. It will be noted in these views, that, with the gate in arresting position, the hook 150 of latch 148 clears the hook 145 of the gate. This allows the latch to drop down to latching position without interference. As gate rocker arm 72 is swung downwardly by its operating link 64, as shown in Figure 13, gate spring 67 begins to elevate the gate, thus swinging the gate hook 145 forwardly a slight distance, allowing the pin 146 to cam down the curve 165 of the hook to the final latching position shown in Figures 13 and 15.

It will be noted that the gate rises slightly as indicated at 159 in Figure 13 when it shifts to final latching position. The gate is therefore locked rigidly against upward movement by the engagement of hook 150 and against downward movement by the latch pin 146. This prevents any slight motion of the gate and therefore protects the edge of the package which is engaged against the gate. As the rocker arm 72 continues to rock, the spring 96 of the gate actuating link 64 compresses slightly each time the pin 73 of the rocker arm 72 rises against the lever extension 74 of the gate.

The purpose of the cam surface 165 of the hook and pin 146 is to keep the gate movement timed with its cam when the solenoid is deenergized to release the gate. In other words, if the gate were unlatched immediately when the solenoid is deenergized, then the gate may be elevated out of time with the presser foot. By way of example, should the metering switch open to deenergize the solenoid when the presser foot is elevated (Figure 12), then the gate would release the entire row of packages instead of metering them.

Assuming that the solenoid 53 is deenergized while the rocker arm 72 is in gate elevating position (Figure 13), the latching lever 148 will shift latch pin 146 to the position shown in broken lines in Figure 15, but the gate will remain latched in arresting position by the engagement of the hooks 145 and 150 as indicated. When the gate cam approaches its gate closing position and elevates the rocker arm 72 (Figure 12), the gate is rocked downwardly slightly to its normal arresting position as indicated at 159 in Figure 13. This motion shifts the gate hook 145 to the release position shown in broken lines in Figure 15, allowing the latching lever to rise. The gate is now under control of its cam and swings to open positions as the rocker arm 72 rocks downwardly under cam rotation (Figure 10).

It is to be noted that the solenoid can be energized to latch the gate only when the parts are in the arresting position shown in Figures 12 and 13. In other words, the packages are advanced only when the gate is lowered and the presser foot is elevated; consequently, the metering control switches 41 and 42 can close only as the row of packages advances against the lowered gate.

It will be understood that while the gate is latched in arresting position, the presser foot continues to reciprocate since this has no effect on the packages. Also, it will be understood from the foregoing, that the latching operation is identical for both stations and that both will resume operation concurrently when the solenoids are deenergized.

*Metering conveyors*

The metering conveyors 6 and 7 are advanced in unison at a rate greater than the accumulating or prime conveyors 1 and 2 in order to space the packages apart as indicated at 5 in Figure 1 as the packages intermittently are released by the metering stations 3. The accumulating conveyors, as stated earlier, are driven at a speed correlated to the output of the wrapping machine, which may be slightly slower than the operating cycles of metering stations. Thus, the supply of packages on the accumulating conveyors 1 and 2 may be depleted periodically to decommission the metering stations. The metering stations and transfer mechanism are so timed that the metering conveyors advance the packages to the transfer mechanism in advance of the cyclic advance of the transfer plungers 11 and 12 (Figure 20).

Referring to Figures 1 and 3 the metering conveyors are driven from the main driven shaft 21 by a bevel gear 166 meshing with a bevel gear 167 secured upon a cross shaft 168 which is journalled in bearings (not shown) mounted upon the machine frame. A sprocket 169, attached to the end of the shaft 168, is connected by a sprocket chain 170 to a sprocket 171 secured to an intermediate cross shaft 172. The lower metering conveyor 7 is driven by a sprocket 173 secured to an end of cross shaft 172 having a sprocket chain 174 meshing with a sprocket 175 secured upon the drive shaft 176 of the lower metering conveyor 7. The upper metering conveyor 6 is driven by a sprocket 177 secured upon the opposite end of shaft 172 having a chain 178 meshing with a sprocket 180 secured upon the drive shaft 181 of the upper metering conveyor.

Both metering conveyors include driving pulleys or rollers 182—182 on drive shafts 176 and 181 and the opposite ends of the conveyors pass around idling rollers 183—183 mounted upon shafts 184—184 (Figure 1). The conveyor belts 185 consist of standard fabric belting of the required width as indicated in Figure 3. As shown in Figure 4, the upper run of each belt is slidably supported upon the angle iron structure 60 which is supported by the frame 61 of the machine. The sweep mechanism, which is disclosed in the co-pending application, is also driven from the bevel gear 166 (Figure 3). As shown by the arrow in Figure 1, the lower run of the sweep mechanism chain, and its pushers 20, travel in the same direction as the metering conveyor. The pairs of packages encounter the stops while the transfer plungers 11 and 12 dwell in their retracted positions, such that the ends of the plungers are clear of the pairs of packages. Since the metering conveyors are driven continuously, the belts slip relative to the arrested packages and maintain the pairs in position against the stops until they are shifted laterally by the transfer plungers. Upon being shifted laterally into stacked relationship, upon the support plates 15 and 16, the pushers 20 of the sweep mechanism advance the stack 5 to the buckets 18 of the cartoning machine.

*Modified arrangement*

As shown diagrammatically in Figure 20, each pressure pad 116 is repositioned to meter the packages in groups of four instead of two packages. Thus, the groups of four packages, indicated at 186—186 are arrested by the gate 55 and released for insertion into a two-pound carton. When the machine is so converted, its operating cycles are identically the same as described above.

In order to accommodate the four packages, the stops 13 and 14 (Figure 1), which are equal in width to two packages, are removed from the machine. Accordingly, upon each cycle of operation, the two groups of four packages are advanced upon the upper and lower metering conveyors toward the stop plates 187 which support the stops 13 and 14. Upon reaching the stop plates, the groups are arrested and are then shifted laterally by the transfer mechanism to the support plates 15 and 16. In order to transfer four packages instead of two, elongated pusher plates 188—188 which have a length sufficient to engage the four packages, are mounted on the transfer plungers (Figure 20). It will be understood that the bucket conveyor and other components of the cartoning machine are also modified as necessary to handle the four package groups.

Having described my invention, I claim:

1. In a machine for arranging articles in group formation, conveyor means for advancing the articles, a metering station mounted relative to the conveyor means, said station including a shiftable gate for arresting the articles on the conveyor means, thereby to reform the same into a solid row, said gate means being shiftable to a release position for releasing articles from the row, spring means connected to the gate normally urging the same to release position, actuating means connected to the gate for shifting the same to arresting position counter to said spring, a solenoid mounted relative to the gate, a shiftable latching element connected to the solenoid and engageable with the gate for latching the same in said arresting position upon energization of the solenoid, a control switch mounted relative to the conveyor means, the switch having an actuating element contacting the row of articles on the conveyor means and normally maintaining said switch in open position, said actuating element shifting the switch to closed position when the trailing end of said row of articles passes beyond the actuating element as the row advances upon the conveyor means, said switch connected to the solenoid and energizing the same to latch the gate in arresting position counter to said spring.

2. In a machine for arranging articles in group formation, conveyor means for advancing the articles, a metering station mounted relative to the conveyor means, said station including a shiftable gate for arresting the articles on the conveyor means and reforming the same into a solid row, the metering station including a presser foot positioned to engage the solid row of articles, actuating means connected to the gate and presser foot for shifting the gate to release position; said actuating means concurrently shifting the presser foot into engagement with the row, whereby the gate releases a group of articles while the presser foot restrains the row, a solenoid mounted relative to the gate, a latching element connected to the solenoid and engageable with the gate to latch the gate in arresting position upon energization of the solenoid, a control switch mounted relative to the conveyor means, said switch having a shiftable actuating element engaging the solid row of articles on the conveyor means and maintaining the switch in open position, said actuating element shiftable to switch closing position upon passage thereunder of the trailing end of the row of articles as the row advances on the conveyor means, thereby to energize the solenoid and latch the gate in article-arresting position.

3. In a machine for grouping articles in stack formation one above the other, a pair of conveyors disposed in parallel horizontal planes one above the other, a respective metering station mounted relative to each conveyor, each of said stations including shiftable gate means for arresting the articles on the conveyors and reforming the same into solid row formation, actuating means connected in common to said gates for shifting the same to article-arresting position, spring means connected to each gate normally urging the same to article-release position, a respective solenoid mounted relative to each gate, respective latching elements connected to the solenoids and engageable with the gates, said latching elements latching the gates in arresting position upon energization of the solenoids, a respective control switch mounted relative to each conveyor, each of said switches connected to both solenoids for energizing the same, each switch including an actuating element contacting the row of articles on the conveyor and maintaining the switch in open position, said actuating element shifting the switch to closed position upon passage of the trailing end of the row of articles, whereby each switch is effective to energize both solenoids and latch the gates in arresting position upon passage of the trailing end of either row of articles.

4. In a machine for arranging articles in group formation, conveyor means for advancing the articles, a metering station mounted relative to the conveyor means, said station including shiftable gate means for arresting the articles on the conveyor means, thereby to reform the same into a solid row, said gate means being shiftable intermittently to a release position for reloading a predetermined number of articles from the row, thereby intermittently advancing the row, actuating means connected to the gate for shifting the same alternately to release and arresting position, a solenoid mounted relative to the gate, a shiftable latching element connected to the solenoid and engageable with the gate for latching the gate in said arresting position upon energization of the solenoid, a plurality of control switches mounted along the conveyor means, each of said switches having a shiftable actuating element spaced apart along the conveyor means and engaging the row of articles on the conveyor means, said actuating elements normally maintaining the switches in open position, said actuating elements shifting the switches to closed position when the trailing end of said row advances beyond the actuating elements, said actuating elements spaced apart along the conveyor a distance greater than intermittent advancement of the row upon the release of articles by the gate, said switches connected in common to the solenoid to energize the same when the first switch, in the direction of article advancement, is shifted to closed position upon release by the gate of said predetermined number of articles, thereby to latch the gate in arresting position until the conveyor advances a number of articles equal to or greater than the number of articles released, said first switch being shifted to open position to deenergize the solenoid and unlatch the gate when the solid row of articles is restored on the conveyor means.

5. In a machine for arranging articles in group formation, conveyor means for advancing the articles, a metering station mounted relative to the conveyor means, said station including shiftable gate means for arresting the articles on the conveyor means, thereby to reform the same into a solid row, said gate means being shiftable intermittently to a release position for releasing the predetermined number of articles from the row, thereby intermittently advancing the row, spring means connected to the gate normally urging the same to release position, actuating means contacting the gate and shifting the same to arresting position counter to said spring, a solenoid mounted relative to the gate, a shiftable latching element connected to the solenoid and engageable with the gate for latching the same in said arresting position upon energization of the solenoid, said latching element holding the gate in said arresting position counter to said spring, a plurality of control switches mounted along the conveyor means, each of said switches having a shiftable actuating element engaging the row of articles on the conveyor means and normally maintaining the switch in open position, said actuating elements spaced apart along the conveyor means, said actuating elements shifting the switches to closed position when the trailing end of said row advances beyond the actuating elements, said switches connected in common to the solenoid to energize the same when the actuating element of the first switch, in the direction of advancement, shifts the switch to closed position, thereby to latch the gate in arresting position until the conveyor advances sufficient articles to restore the row and shift the actuating element of said first switch to open position to deenergize the solenoid and unlatch the gate.

6. In a metering station for an article conveyor, a frame mounted relative to the conveyor, a gate pivotally mounted in said frame having a portion disposed above the conveyor in position to engage and arrest the articles thereon, a gate spring connected to the gate to pivot the same to an article release position, actuating means contacting the gate to pivot the same to an article arresting position counter to said spring, a shiftable normally disengaged latching lever pivotally mounted in said frame and having a swinging end including a hook disposed adjacent the gate, a latching element projecting from the gate in position to be engaged by the hook to latch the gate in article arresting position, a shiftable actuating lever pivotally mounted in frame adjacent the latching lever, said actuating lever having a stop element normally engaging and maintaining the latching lever in said disengaged position, electrical power means connected to said actuating lever to shift the actuating lever and latching lever to engaged position upon energization of the electrical power means, and switch means connected to the electrical power means for energizing the same, thereby latching the gate to article arresting position counter to said gate spring.

7. In a metering station for an article conveyor, a frame mounted relative to the conveyor, a shiftable gate pivotally mounted in said frame having a portion disposed above the conveyor in position to engage and arrest the articles thereon, a gate spring connected to the gate to pivot the same to an article release position, actuating means connected to the gate to pivot the same to an article-arresting position counter to said spring, a shiftable, normally disengaged latching lever pivotally mounted in said frame and having a swinging end including a hook disposed adjacent the gate, a latching element projecting from the gate and having a latching surface positioned to be engaged by said hook to latch the gate in article arresting position, counter to the gate spring upon shifting of the latching lever to engaged position, a latch spring connected to the latching lever and urging the same toward latching position, a shiftable actuating lever pivotally mounted in the frame adjacent the latching lever and having a stop element normally engaging and maintaining the latching lever in disengaged position counter to said latch spring, said stop element positioned to engage the latching element of the gate on the side opposite to said latching surface upon shifting of the latching lever to latching position, a solenoid connected to said actuating lever to shift the actuating lever and latching lever to latching position upon energization of the solenoid, and switch means connected to the solenoid for energizing the same, thereby latching the gate in article arresting position by the opposed engagement of said hook and stop element against opposite sides of the latching element of the gate.

8. A metering station for an article grouping machine having a conveyor for advancing individual articles, said metering station comprising, a frame mounted relative to the conveyor, a gate shiftably mounted upon said frame, said gate residing in an arresting position in the path of the articles advancing on the conveyor and arresting and reforming the articles into a solid row upon the conveyor, said gate being shiftable to a second position remote from the said path of advancement for releasing the solid row of articles, a presser spaced from the gate upstream along the conveyor, said presser residing in a position frictionally engaging the articles on the conveyor for restraining the same, said presser being shiftable to a second position releasing said articles, the position of the presser upstream from said gate determining the number of articles residing between the gate and presser, actuating means in driving connection with said gate and presser, said actuating means shifting the gate to said article-releasing position while maintaining the presser in frictional engagement with the row of articles on the conveyor to restrain the same, thereby to release the group of articles residing between the presser and gate, said actuating means shifting said gate to said article-arresting position and thereafter shifting the presser to said second position releasing the row of articles for advancement into engagement with the gate, a shiftable feeler contacting the row of articles on the conveyor, said feeler shifting to a second position when the row of articles advances beyond the feeler, a latching element engageable with the gate when the gate is in said article-arresting position, and means interconnecting the feeler and latching element and shifting the same to a gate latching position, when the feeler shifts to said second position, said latching element holding the gate in said arresting position until the said row of articles is restored on the conveyor.

9. A metering station for an article grouping machine having a conveyor for advancing individual articles, said metering station comprising, a frame mounted relative to the conveyor, a gate shiftably mounted on said frame, said gate residing in an article-arresting position in the path of the articles advancing on the conveyor and arresting and reforming the articles into a solid row upon the conveyor, said gate being shiftable to a second article-releasing position remote from the said path of advancement and releasing the solid row of articles, a presser spaced from the gate upstream along the conveyor, said presser residing in a position engaging the row of articles on the conveyor for restraining the same, said presser being shiftable to a second position releasing said row of articles, actuating means in driving connection with said gate and presser, said actuating means shifting said gate to said article-releasing position while maintaining the presser in engagement with the row of articles on the conveyor to restrain the same, thereby to release the group of articles residing between the presser and gate, said actuating means shifting said gate to the article-arresting position and thereafter shifting the presser to said second position releasing the articles for advancement into engagement with the gate, power means mounted relative to the gate, shiftable latch means connected to the power means and engageable with the gate, said latch means normally disengaged from the gate, and control means connected to the power means, said control means shifting the latch means to a gate-latching position, said control means being responsive to the row of articles on the conveyor and shifting said latch means into a latching position relative to the gate upon depletion of the row of articles on the conveyor, said latch means, upon being shifted to said latching position, engaging the gate upon partial movement of the gate from the arresting position toward the release position, said latch means shifting to a release position in response to the control means when the row of articles is restored on the conveyor, said latch means thereafter being effective to release the gate after the actuating means has shifted the gate partially from the release position toward the arresting position, whereby the operation of the gate is resumed in time with the operation of the actuating means of the gate and presser.

10. A metering station for an article grouping machine having a conveyor for advancing individual articles, said metering station comprising, a frame mounted relative to the conveyor, a gate shiftably mounted upon said frame, said gate residing in an article-arresting position in the path of the articles advancing on the conveyor and arresting and reforming the articles into a solid row upon the conveyor, said gate being shiftable to a second article-releasing position remote from the said path of advancement and releasing the solid row of articles, yieldable means normally urging said gate to said article-releasing position, a presser spaced from the gate upstream along the conveyor, said presser residing in a position engaging the row of articles on the conveyor for restraining the same, said presser being shiftable to a second position releasing said row of articles, reciprocating means in driving connection with said gate and presser, said reciprocating means shifting the gate to said article-releasing position while the presser is in frictional engagement with the row of articles on the conveyor to restrain the same, thereby to release the group of articles residing between the presser and gate, said reciprocating means shifting said gate to said article-arresting position and thereafter shifting the presser to said second position releasing the row of articles for advancement into engagement with the gate, power means mounted related to the gate, latch means connected to the power means, said latch means being shiftable to a gate-engaging position and including a catch element, a catch means on the gate engageable by said catch element upon shifting of the latch means to a gate-engaging position, control means connected to said power means of the latch means, said control means being responsive to the row of articles on the conveyor and shifting the latch means into latching position with the catch means of the gate upon depletion of the row of articles on the conveyor, said catch element, upon being shifted into latching position, being engageable with the catch means of the gate upon partial movement of the gate from the arresting position toward the release position and latching the gate in said arresting position counter to said yieldable means, said reciprocating means idling relative to the gate when the same is latched in said arresting position, said control means releasing said latch means when the row of articles is restored on the conveyor, said catch element remaining in engagement with the latch means of the gate until the gate is shifted by said reciprocating means from said partial release position to the arresting position and thereupon releasing the gate, whereby the operation of the gate is resumed in time with the operation of the reciprocating means of the gate and presser.

References Cited in the file of this patent

UNITED STATES PATENTS

| | | |
|---|---|---|
| 1,904,613 | Braren | Apr. 18, 1933 |
| 1,963,083 | Fink | June 19, 1934 |
| 2,491,651 | Everett | Dec. 20, 1949 |
| 2,761,545 | Hoagland | Sept. 4, 1956 |

FOREIGN PATENTS

| | | |
|---|---|---|
| 245,273 | Great Britain | Jan. 7, 1926 |